United States Patent [19]

Mou

[11] Patent Number: 5,940,873
[45] Date of Patent: Aug. 17, 1999

[54] ADDRESS-TRANSLATION METHOD AND SYSTEM FOR TRANSLATING EFFECTIVE ADDRESSES INTO PHYSICAL ADDRESSEE IN COMPUTERS

[75] Inventor: Ya-Nan Mou, Taipei, Taiwan

[73] Assignee: United Microelectronics Corp., Hsinchu, Taiwan

[21] Appl. No.: 08/927,067

[22] Filed: Sep. 10, 1997

[30] Foreign Application Priority Data

Jun. 26, 1997 [TW] Taiwan .................................. 86108925

[51] Int. Cl.[6] ....................................................... G06F 12/10
[52] U.S. Cl. ........................................... 711/208; 711/206
[58] Field of Search .................................... 711/200, 202, 711/203, 206, 207, 208

[56] References Cited

U.S. PATENT DOCUMENTS

| | | | |
|---|---|---|---|
| 4,631,660 | 12/1986 | Woffinden et al. ......................... | 711/3 |
| 5,630,088 | 5/1997 | Gupta et al. .............................. | 711/207 |
| 5,652,872 | 7/1997 | Richter et al. ........................... | 395/500 |

*Primary Examiner*—Eddie P. Chan
*Assistant Examiner*—Kevin L. Ellis
*Attorney, Agent, or Firm*—Rabin & Champagne, P.C.

[57] ABSTRACT

An address-translation method is provided for efficiently translating effective addresses into physical addresses in X-86 based computers. In this method and system, when an effective address is generated, a segment base is then generated from a segment-descriptor cache memory in response to a selector address from the microcode. The segment base is added to the effective address to thereby obtain a linear address and a carry from the addition of the low-order portions of the segment base and the effective address. This carry is added to the high-order portion of the effective address to thereby obtain a comparison effective address. The comparison effective address and the segment base are then compared with a set of predetermined address values in a Translation Lookaside Buffer. If there is a match, a corresponding page base will be generated. The page base is then combined with the low-order portion of the linear address to thereby obtain the desired physical address. This address-translation method and system can speed up the access to the main memory since the address-translation and the linear address computation are proceeded in parallel, and also allow an increase in the hit ratio since the comparison process carried out in the Translation Lookaside Buffer involves the segment base from the segment-descriptor cache memory.

15 Claims, 3 Drawing Sheets

5,940,873

ADDRESS-TRANSLATION METHOD AND SYSTEM FOR TRANSLATING EFFECTIVE ADDRESSES INTO PHYSICAL ADDRESSEE IN COMPUTERS

BACKGROUND OF THE INVENTION

1. Field of the Invention

This invention relates to addressing methods in computers, and more particularly, to an address-translation method and system used in conjunction with a central processing unit (CPU), such as the Intel X-86 family of microprocessors, for translating (mapping) effective addresses (EA), which are also referred to as logic addresses, into physical addresses (PA) that are used to gain access to physical locations in the memory.

2. Description of Related Art

In high-end computer systems, such as the X-86 microprocessor based personal computers, the provision of the virtual memory capability allows the microprocessor to use the main memory as though it has an expanded, limitless capacity, such that the microprocessor can execute very large programs. With virtual memory, the programmer can have a limitless memory space to use from a memory unit of a fixed size. An efficient virtual memory addressing scheme is therefore a primary research effort in the computer industry.

In X-86 based computers, the access to the virtual memory is through the use of the so-called effective addresses (EA) that are either explicitly or implicitly stated in object codes. The physical addresses (PA) that are used to gain access to the physical locations in the main memory are obtained by mapping the effective addresses in prearranged manners. In general, the mapping of the effective addresses to the physical addresses is a complex procedure that takes much time to complete.

To speed up the mapping, a conventional scheme is to use a high-speed memory unit in the microprocessor called Translation Lookaside Buffer (TLB) to carry out the address-translation process. The TLB is a specifically designed cache memory that can output the corresponding physical address of an effective address when the effective address is input thereinto. The physical addresses are determined by comparing the current linear address (LA) with prestored data in a so-called tag storage unit in the TLB. The tag storage unit is part of a content-addressable memory (CAM).

FIG. 1 is a schematic diagram of a conventional address-translation system for use on an X-86 based computer to translate effective addresses into physical addresses. This address-translation system includes an effective-address generator 10, a segment-descriptor cache memory 11, and a Translation Lookaside Buffer (TLB) 12. Further, the translation lookaside buffer 12 includes a tag storage unit 13 and a data storage unit 14 which are both built on a content-addressable memory (CAM).

The effective-address generator 10 can generate an output 32-bit effective address (EA) by summing up a base, a displacement, and an index and then multiplying the sum by a scaling factor. At the same time, the segment-descriptor cache memory 11 receives a selector address (SA) and generates a corresponding segment base (SB) which is also a 32-bit value. The effective address (EA) from the effective-address generator 10 and the segment base (SB) from the segment-descriptor cache memory 11 are then summed up to thereby obtain a linear address (LA).

The linear address (LA) is also a 32-bit value whose low-order bits 0–11 represent a segment address and whose high-order bits 12–32 represent a page address. The page address is transferred to the tag storage unit 13 in the TLB 12 where it is compared with a set of prestored linear address values LA' in the tag storage unit 13. If there is a match, the tag storage unit 13 outputs and transfers a HIT signal to the data storage unit 14 to fetch a corresponding page base (PB) from the same. The page base (PB) is a 20-bit value, which is then combined with the low-order 12-bit portion of linear address (LA) to thereby obtain a 32-bit value which serves as the desired physical address (PA).

One drawback to the foregoing address-translation system, however, is that, since the determination of the physical address (PA) requires the steps of first obtaining effective address (EA) and the linear address (LA), the computation time is quite lengthy. Moreover, since the data stored in the tag storage unit 13 are linear addresses LA' that are compared in a sequential manner, it will cause a critical path in the computation process that degrades the performance of the computer system.

FIG. 2 is a schematic diagram of another conventional address-translation system for use on an X-86 based computer to translate effective addresses into physical addresses. As shown, this address-translation system includes an effective-address generator 20, a segment-descriptor cache memory 21, a TLB 22, a translation lookaside invalid controller 23, an adder 24, and a bit combinator 26. Further, the TLB 22 includes a tag storage unit 27 and a data storage unit 28.

The effective-address generator 20 can generate a 32-bit effective address (EA). The high-order bits 12–31 of the effective address (EA), designated by EAH, are transferred to the TLB 22. A 4-bit selector address (SA) from the microcode is input to the segment-descriptor cache memory 21 which can correspondingly generate a 32-bit segment base (SB). The effective address (EA) from the effective-address generator 20 and the segment base (SB) from the segment-descriptor cache memory 21 are then summed up at the adder 24 to thereby obtain a 32-bit linear address (LA) whose low-order bits 0–11, designated by PAL, are to be used as the low-order 12 bits of the physical address (PA). At the same time, the translation lookaside invalid controller 23 outputs and transfers an invalid signal IV to the TLB 22.

In the TLB 22, the EAH value is compared with a set of prestored values EAH' in the tag storage unit 27. If there is a match, the tag storage unit 27 generates and transfers a HIT signal to the data storage unit 28. In response to the HIT signal, the data storage unit 28 outputs a corresponding page base (PB) which is a 20-bit value, represented by PAH, that is to be used as the high-order 20 bits of the physical address (PA). Subsequently, the 20-bit PAH value from the data storage unit 28 and the 12-bit PAL from the adder 24 are combined at the bit combinator 26 to thereby obtain a 32-bit value which serves as the desired physical address (PA).

One drawback to the foregoing address-translation system of FIG. 2, however, is that, since it lacks the step of comparing segment bases (SB) in the TLB 22, in the event that the segment base is changed, an action of invalidation must be imposed on all of the bits in the TLB 22. This will result in a very low hit ratio.

SUMMARY OF THE INVENTION

It is therefore a primary objective of the present invention to provide an address-translation method which can speed up the translation (mapping) of effective addresses into physical addresses.

It is another objective of the present invention to provide an address-translation method which can help increase the hit ratio for the translation of effective addresses into physical addresses.

It is still another objective of the present invention to provide a hardware-based address-translation system which can carry out the above-mentioned address-translation method of the invention.

In accordance with the foregoing and other objectives of the present invention, a new address-translation method and a hardware-based address-translation system for performing the address-translation method are provided.

The method of the invention includes the following procedural steps:

(1) generating a selector address;

(2) in accordance with a prestored segment descriptor, generating a segment base in response to the selector address, the segment base consisting of a high-order portion and a low-order portion with the same numbers of bits as the high-order portion and low-order portion of the effective address;

(3) adding the segment base to the effective address to thereby obtain a linear address and a carry, the carry being obtained from the addition of the low-order portion of the segment base to the low-order portion of the effective address;

(4) adding the carry to the high-order portion of the effective address to thereby obtain a comparison effective address;

(5) comparing the comparison effective address and the segment base respectively with a first address value and a second address value; if there is a match, generating a hit signal;

(6) in response to the hit signal, generating a corresponding page base;

(7) extracting the low-order portion of the linear address; and (8) combining the low-order portion of the linear address with the page base in such a manner that the low-order portion of the linear address serves as the low-order portion of the desired physical address and the page base serves as the high-order portion of the same.

Moreover, the system for executing the foregoing method of the invention includes the following constituent elements:

(a) a segment-descriptor cache memory which can generate a segment base in response to a selector address, said segment base consisting of a high-order portion and a low-order portion with the same numbers of bits as the high-order portion and low-order portion of said effective address;

(b) an adder for adding the segment base to the effective address to thereby obtain a linear address and a carry, the carry being obtained from the addition of the low-order portion of the segment base to the low-order portion of the effective address;

(c) add-carry means for adding the carry to the high-order portion of the effective address to thereby obtain a comparison effective address;

(d) a Translation Lookaside Buffer which compares the comparison effective address and the segment base with a first address value and a second address value; if there is a match, said generating a corresponding page base; and (e) means for combining the low-order portion of the linear address with the page base in such a manner that the low-order portion of the linear address serves as the low-order portion of the desired physical address and the page base serves as the high-order portion of the same.

The invention can allow an increase in the access speed to memory since the address translation and the computation for linear address are carried out in parallel. Moreover, the invention can allow an increase in the hit ratio since the comparison process in the Translation Lookaside Buffer involves the comparison on the segment base (SA) from the segment-descriptor cache memory.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 3:
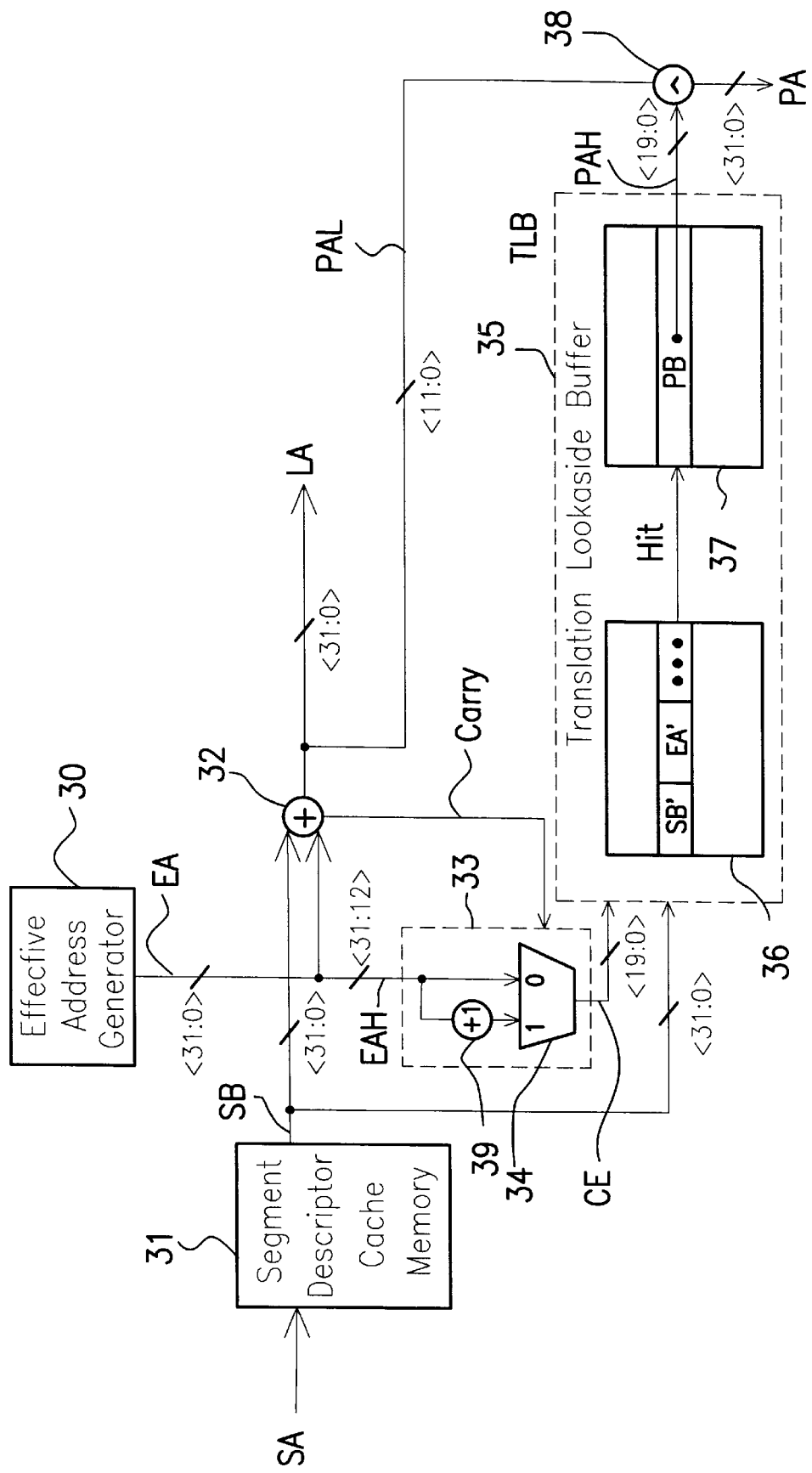
FIG. 3 is a schematic diagram of the address-translation system according to the invention.

FIG. 3 is a schematic diagram of the address-translation system according to the invention for use on an X-86 based computer to translate effective addresses into physical addresses. As shown, this address-translation system includes an effective-address generator 30, a segment-descriptor cache memory 31, an adder 32, an add-carry unit 33, a Translation Lookaside Buffer (TLB) 35, and a bit combinator 38. Further, the add-carry unit 33 is composed of a multiplexer 34 and an add-one unit 39, and the TLB 35 is composed of a tag storage unit 36 and a data storage unit 37.

The effective-address generator 30 can generate an output 32-bit effective address (EA) by summing up a base, a displacement, and an index and then multiplying the sum by a scaling factor. Concurrently, a 4-bit selector address (SA) from the micro-code is input to the segment-descriptor cache memory 31 which then generates a corresponding 32-bit segment base (SB). The segment base (SB) is stored in a multiplexer (not shown) having a set of 16 registers in the segment-descriptor cache memory 31.

The 32-bit effective address (EA) from the effective-address generator 30 and the 32-bit segment base (SB) from the segment-descriptor cache memory 31 are then summed up at the adder 32 to thereby obtain a 32-bit linear address (LA) whose low-order 12 bits 0–11, represented by PAL, are to be used as the low-order 12 bits of the physical address (PA). Moreover, the carry resulted from the addition of the low-order 12 bits 0–11 of the effective address (EA) to the low-order 12 bits 0–11 of the segment base (SB) is transferred to the multiplexer 34 in the add-carry unit 33.

At the same time, the high-order 20 bits 12–31 of the effective address (EA), which are designated collectively by EAH, are sent to the add-carry unit 33. The carry from the adder 32 acts as a selection control signal to the multiplexer 34 in such a manner that the output of the multiplexer 34, which is named as comparison effective address (CE), is CE=EAH+1 when Carry=1, and CE=EAH when Carry=0. The comparison effective address (CE) is a 20-bit value.

The comparison effective address (CE) from the add-carry unit 33 and the segment base (SB) from the segment-descriptor cache memory 31 are sent together to the TLB 35. In the TLB 35, the tag storage unit 36 is built on a content-addressable memory (CAM) which stores a set of predetermined 20-bit EA' values which are used for comparison with the effective address (EA) and a set of 32-bit SB' values which are used for comparison with the segment base (SB). These values are the results of some previously executed actions that represent available addresses. The tag storage unit 36 then compares the received comparison effective address (CE) and segment base (SB) respectively with the prestored EA' and SB' values therein to see if there are any matches. If yes, the tag storage unit 36 generates and transfers a HIT signal to the data storage unit 37.

The data storage unit 37 is also built on the CAM, which stores a 20-bit page base (PB). Whenever the data storage unit 37 receives the HIT signal from the tag storage unit 36, it will output the 20-bit page base (PB), now represented by PAH, which is to be used as the high-order 20 bits 12–31 of the physical address (PA).

If the comparison effective address (CE) is not matched to any of the prestored EA'values, or the segment base (SB) is not matched to any of the prestored SB' values in the tag storage unit 36, the HIT signal is disabled. In response to this situation, an error signal will be generated and transferred to the CPU (not shown) which will then refresh the prestored data in the tag storage unit 36 and the data storage unit 37.

Subsequently, the 20-bit PAH from the data storage unit 37 and the 12-bit PAL from the adder 32 are combined to form a 32-bit value which serves as the desired physical address (PA).

When the segment base (SB) is changed due to a change in the data stored in the segment-descriptor cache memory 31 or a change in the input selector address (SA), the SB' values stored in the tag storage unit 36 should be refreshed so that the new segment base (SB) can find the correct match.

Figure 1:
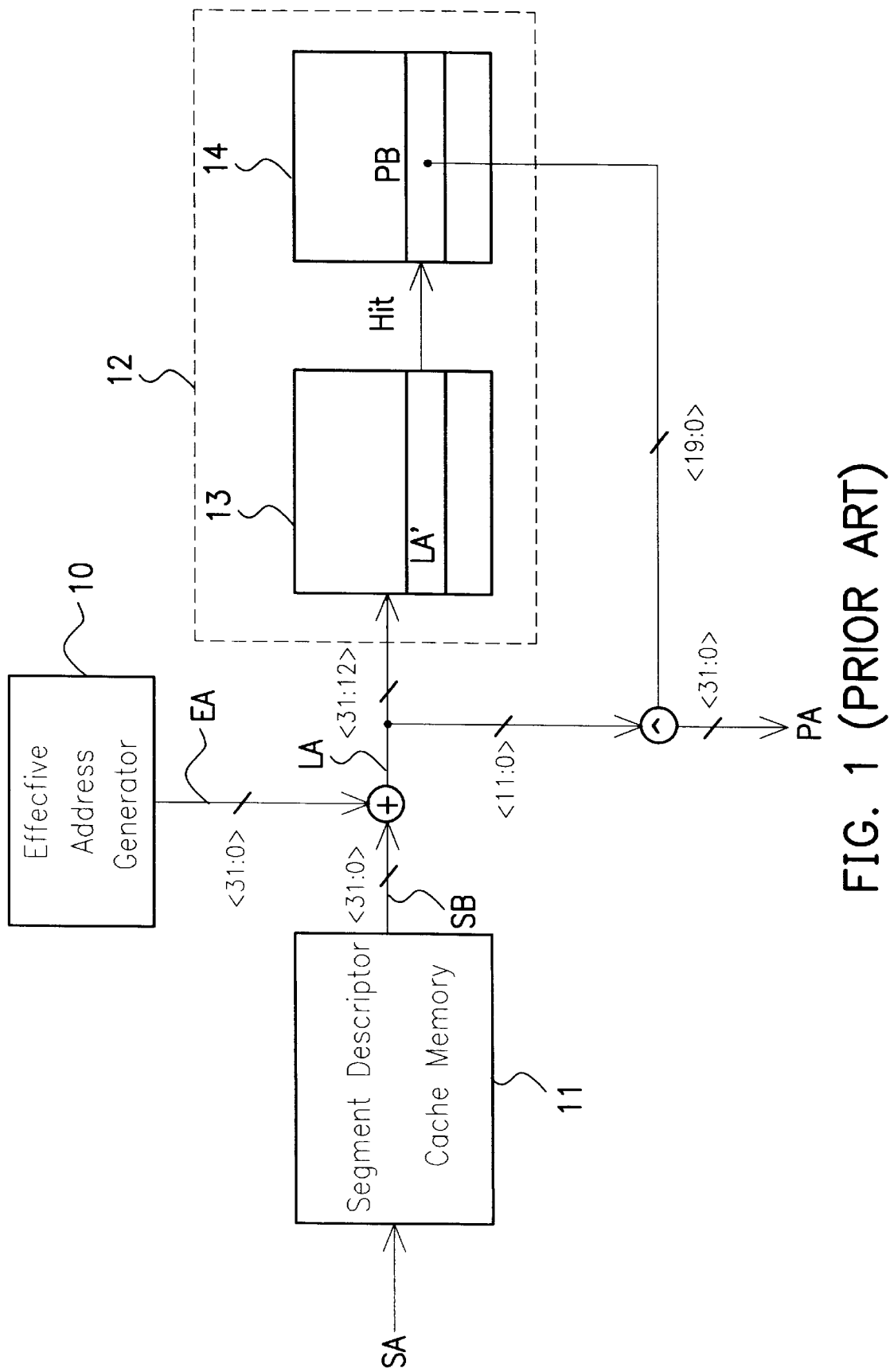
FIG. 1 is a schematic diagram of a first conventional address-translation system.
Figure 2:
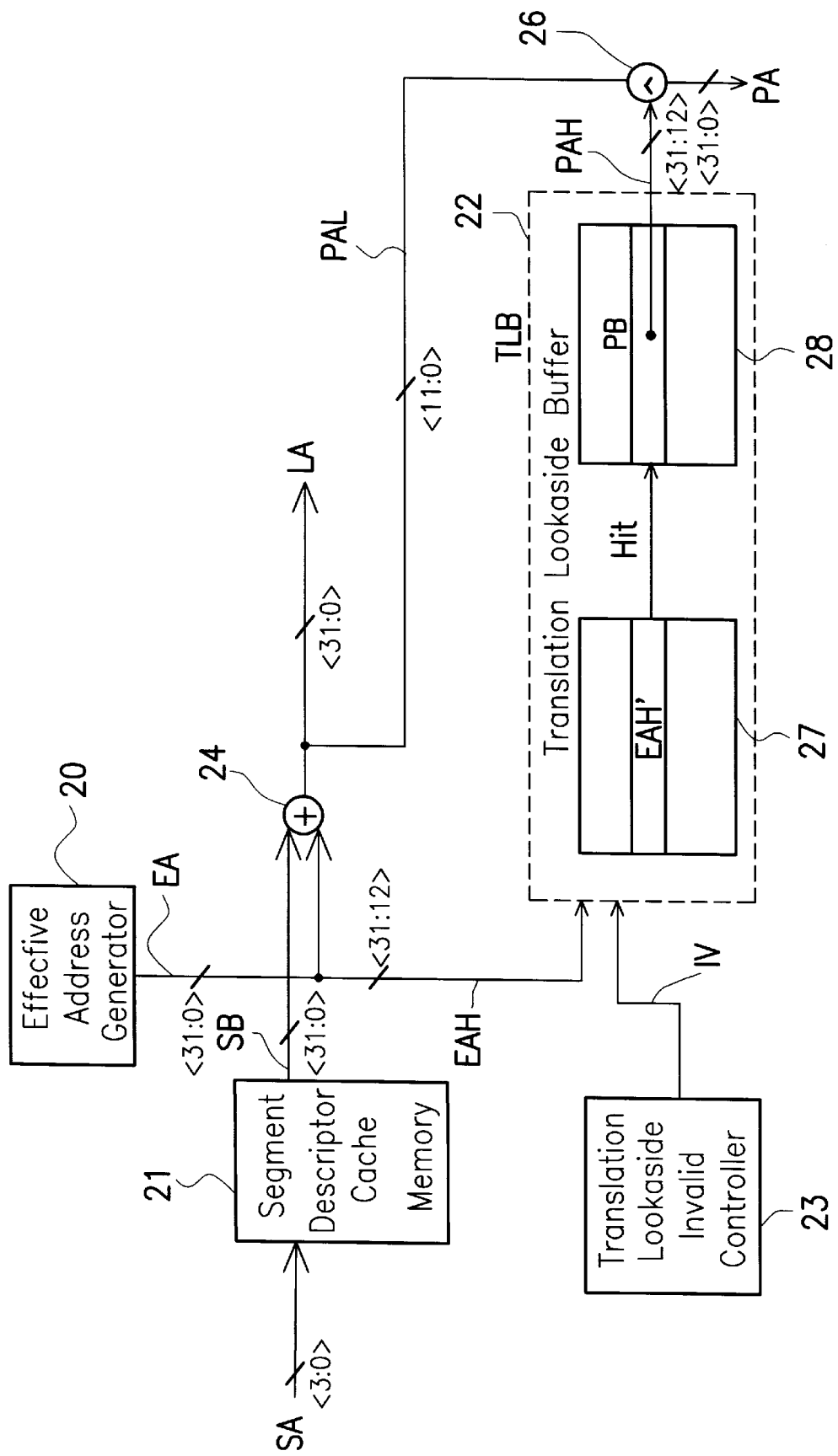
FIG. 2 is a schematic diagram of a second conventional address-translation system.

In conclusion, the invention has several advantages over the conventional systems shown in FIGS. 1 and 2. First, the invention can speed up the access to the main memory since the address-translation process and the computation process for linear address are proceeded in parallel. Second, the invention can allow an increase in the hit ratio since the comparison process carried out in the TLB involves the segment base (SA) from the segment-descriptor cache memory.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An address-translation method for translating an effective address into a physical address, the effective address and the physical address each consisting of a high-order portion and a low-order portion, said address-translation method comprising the steps of:

(1) generating a selector address;
   (2) in accordance with a prestored segment descriptor, generating a segment base in response to the selector address, the segment base consisting of a high-order portion and a low-order portion with the same numbers of bits as the high-order portion and low-order portion of the effective address;
   (3) adding the segment base to the effective address to thereby obtain a linear address and a carry, the carry being obtained from the addition of the low-order portion of the segment base to the low-order portion of the effective address;
   (4) adding the carry to the high-order portion of the effective address to thereby obtain a comparison effective address;
   (5) comparing the comparison effective address and the segment base respectively with a first address value and a second address value; if there is a match, generating a hit signal;
   (6) in response to the hit signal, generating a corresponding page base;
   (7) extracting the low-order portion of the linear address; and
   (8) combining the low-order portion of the linear address with the page base in such a manner that the low-order portion of the linear address serves as the low-order portion of the desired physical address and the page base serves as the high-order portion of the same.

2. The address-translation method of claim 1, wherein the first address value is a predetermined effective address and the second address value is a predetermined segment base.

3. The address-translation method of claim 1, wherein the effective address is a 32-bit value.

4. The address-translation method of claim 1, wherein the segment base is a 32-bit value.

5. The address-translation method of claim 1, wherein the linear address is a 32-bit value.

6. The address-translation method of claim 1, wherein the high-order portion of the effective address contains 20 bits, while the low-order portion of the same contains 12 bits.

7. The address-translation method of claim 1, wherein the carry is obtained from the adding of the low-order 12 bits of the segment base to the low-order 12 bits of the effective address.

8. The address-translation method of claim 1, wherein in said step (5), if there is no match, the address-translation method further comprises the steps of:

refreshing the first and second address values; and
   repeating said step (5).

9. An address-translation system for translating an effective address into a physical address, the effective address and the physical address each consisting of a high-order portion and a low-order portion, said address-translation system comprising:

a segment-descriptor cache memory which can generate a segment base in response to a selector address, said segment base consisting of a high-order portion and a low-order portion with the same numbers of bits as the high-order portion and low-order portion of said effective address;
   an adder for adding the segment base to the effective address to thereby obtain a linear address and a carry, the carry being obtained from the addition of the low-order portion of the segment base to the low-order portion of the effective address;
   add-carry means for adding the carry to the high-order portion of the effective address to thereby obtain a comparison effective address;
   a Translation Lookaside Buffer which compares the comparison effective address and the segment base with a first address value and a second address value; if there is a match, said generating a corresponding page base; and means for combining the low-order portion of the linear address with the page base in such a manner that the low-order portion of the linear address serves as the low-order portion of the desired physical address and the page base serves as the high-order portion of the same.

10. The address-translation system of claim 9, wherein said Translation Lookaside Buffer includes:

a tag storage unit which is prestored with a set of predetermined address values and capable of comparing the comparison effective address and said segment base with the predetermined address values, if there is a match, said tag storage unit generating a hit signal; and data storage unit which is capable of generating the page base in response to the hit signal from said tag storage unit.

11. The address-translation system of claim 9, wherein the first address value is a predetermined effective address and the second address value is a predetermined segment base.

12. The address-translation system of claim 9, wherein said add-carry means includes:

an add-one unit for adding one to the high-order portion of the effective address; and a multiplexer having a first input coupled to receive the high-order portion of the effective address and a second input coupled to receive the output of said add-one unit, said multiplexer being controlled by the carry from said adder in such a manner that when the carry is 0, said multiplexer takes on the first input as its output; and when the carry is 1, said takes on the second input as its output.

13. The address-translation system of claim 9, wherein the effective address, the segment base, and the linear address are each a 32-bit value.

14. The address-translation system of claim 13, wherein the high-order portion of the effective address contains 20 bits.

15. The address-translation system of claim 13, wherein the high-order portion of the physical address contains 20 bits, while the low-order portion of the same contains 12 bits.

* * * * *